United States Patent [19]

Ueno et al.

[11] Patent Number: 4,999,713
[45] Date of Patent: Mar. 12, 1991

[54] INTERLOCKED ZOOMING APPARATUS FOR USE IN STEREOSCOPIC CAMERAS

[75] Inventors: Atsushi Ueno; Takao Suzuki, both of Tochigi, Japan

[73] Assignee: Sharp Kabushiki Kaisha, Osaka, Japan

[21] Appl. No.: 318,634

[22] Filed: Mar. 3, 1989

[30] Foreign Application Priority Data

Mar. 7, 1988 [JP] Japan .................. 63-53024
Jun. 14, 1988 [JP] Japan .................. 63-146601

[51] Int. Cl.$^5$ .............................................. H04N 9/54
[52] U.S. Cl. ...................................... 358/225; 358/88; 352/60; 352/57
[58] Field of Search .................. 358/88, 225; 354/113; 352/57, 58, 60, 62

[56] References Cited

U.S. PATENT DOCUMENTS

| | | | |
|---|---|---|---|
| 4,418,993 | 12/1983 | Lipton | 352/60 |
| 4,559,555 | 12/1985 | Schoolman | 358/88 |
| 4,562,463 | 12/1985 | Lipton | 358/88 |
| 4,734,756 | 3/1988 | Butterfield et al. | 358/88 |
| 4,751,570 | 6/1988 | Robinson | 358/88 |
| 4,819,064 | 4/1989 | Diner | 358/88 |

OTHER PUBLICATIONS

Japanese Patent Laying-Open Gazette; "Image Sensing Apparatus"; No. 62687/1982, dated Apr. 15, 1982 by Masataka Izaki.

Primary Examiner—Joseph A. Orsino
Assistant Examiner—Jill Jackson

[57] ABSTRACT

Disclosed is an improved interlocked zooming apparatus used in a two-barrel type stereo scopic camera. The improved interlocked zooming apparatus includes an adjusting apparatus for adjusting the range of movement of one of the zoom lenses and an automatic image magnification adjusting apparatus for matching the rates of the change in size of images formed by two cameras. Since the sizes of the images in each of the wide-angle end and the telephoto end are first made uniform by the adjusting apparatus before sensing an image, the sizes of the images formed by both the cameras are uniform over the entire zoom region.

14 Claims, 17 Drawing Sheets

INTERLOCKED ZOOMING APPARATUS FOR USE IN STEREOSCOPIC CAMERAS

BACKGROUND OF THE INVENTION

1. Field of the Invention

The present invention relates generally to interlocked zooming apparatuses suitable for use in a stereo camera comprising a pair of video cameras, or the like, and more particularly to an interlocked zooming apparatus capable of easily carrying out interlocked zooming.

2. Description of the Background Art

An interlocked zooming apparatus of interest in regard to the present invention is disclosed in, for example, Japanese Patent Laying-Open Gazette No. 62687/1982. FIG. 1 is a typical diagram showing an image pick up apparatus comprising a conventional interlocked zooming apparatus, as appearing above-noted in the gazette.

Referring to FIG. 1, the image pick up apparatus having the conventional interlocked zooming apparatus comprises first and second video cameras 101 and 102 for sensing an image of an object 116 to be photographed, a synchronizing signal generator 117 for generating a signal for operating the first and second video cameras 101 and 102 in a synchronized manner, and a signal switching device 118 for switching output signals from the first and second video cameras 101 and 102. The first and second video cameras 101 and 102 respectively comprise first and second zoom lenses 103 and 104 for zooming. The first and second zoom lenses 103 and 104 respectively comprise variator means 105 and 106 for varying the magnification of the object by respectively changing the focal lengths of the zoom lenses, and focusing means 108 and 109 for respectively adjusting the focuses of the zoom lenses changed by the variator means 105 and 106. The conventional interlocked zooming apparatus further comprises an in-focus operating member 107 for interlocking the focusing means 108 and 109 with each other and a variator operating member 110 for interlocking the variator means 105 and 106 with each other. Both the in-focus operating member 107 and the variator operating member 110 are operated by manually operating portions 41 and 44. Connections between the focusing means 108 and 109 and the in-focus operating member 107 and between the variator means 105 and 106 and the variator operating member 110 are respectively made by flexible cables 111.

Description is now made of an operation of the conventional interlocked zooming apparatus. When the first and second video cameras 101 and 102 are interlocked with each other for zooming, a user manually operates the manually operating portions 41 and 44 of the variator operating member 110 and the in-focus operating member 107 while watching a monitor screen (not shown) for two video cameras. Consequently, the first and second video cameras 101 and 102 are manually adjusted such that images at the time of zooming match.

The conventional interlocked zooming apparatus is structured as described above. Thus, the zoom lenses of the right and left video cameras must be manually adjusted every time the condition for sensing an image, such as a place where a picture is taken, is changed. Thus, the operability of the cameras is poor at the time of sensing an image, so that it takes an extended period of time to take a picture.

Additionally, in the conventional interlocked zooming apparatus, the range of adjustment of two zoom lenses is limited. More specifically, the first and second zoom lenses are not necessarily manufactured to be all the same. Even through the first and second zoom lenses are manufactured to be all the same, they are not necessarily incorporated in the main bodies of the video cameras in the same manner. Various parts used when the zoom lenses are respectively incorporated in the video cameras are not all the same. Since an ordinary DC motor is used as a motor for moving the zoom lenses via electric power, it is difficult to uniformly perform the control. In addition, it is difficult to make constant the environmental condition at the time of sensing an image and setting of the pair of cameras. Thus, it is difficult for a user to manually adjust the sizes of images formed by a pair of video cameras under such conditions. More specifically, it is actually difficult to simultaneously adjust the sizes of the right and left images according to changes in zoom ratios of the zoom lenses by manually operating the focusing means and the variator means in a two-barrel type stereo scopic camera.

SUMMARY OF THE INVENTION

Therefore, an object of the present invention is to easily adjust the sizes of right and left images formed when the zoom ratios of two zoom lenses are varied, in an interlocked zooming apparatus in a two-barrel type stereo scopic camera.

Another object of the present invention is to make uniform the sizes of right and left images at the time of zooming, in an interlocked zooming apparatus in a two-barrel type stereo scopic camera.

Still another object of the present invention is to easily make uniform the sizes of two images formed by right and left zoom lenses, in an interlocked zooming apparatus.

A further object of the present invention is to easily vary the zoom ratio, in an interlocked zooming apparatus.

The present invention is directed to an interlocked zooming apparatus for operating in a synchronized manner a pair of video cameras, provided spaced apart from each other, for sensing an image of the same object. One of the pair of video cameras comprises a first zoom lens and the other video camera comprises a second zoom lens, which comprises first focal length changing means for changing the focal length of the first zoom lens, second focal length changing means for changing the focal length of the second zoom lens, and zoom means driving means for driving the first focal length changing means and the second focal length changing means by electric power in a synchronized manner. In the interlocked zooming apparatus according to the present invention, the first and second zoom lens focal length changing means respectively provided in the right and left cameras are driven by electric power in a synchronized manner. Thus, when the focal length of one of the zoom lenses is changed, the focal length of the other zoom lens is simultaneously changed by electric power. As a result, in the interlocked zooming apparatus in the two-barrel type stereo scopic camera, the sizes of right and left images can be easily adjusted when the zoom ratios of the two zoom lenses are varied.

In accordance with a preferred embodiment of the present invention, the interlocked zooming apparatus further comprises magnification adjusting means for adjusting to a first size the size of an image in the telephoto end of each of the first and second zoom lenses and adjusting to a second size the size of an image in the wide-angle end of each of the first and second zoom lenses. Since the interlocked zooming apparatus comprises the above described magnification adjusting means, adjustment is made such that the sizes of the images formed by cameras in each of the telephoto end and the wide-angle end become uniform respectively. Zooming by each of the cameras is carried out between the telephoto end and the wide-angle end where the sizes of the images are made uniform. As a result, in the interlocked zooming apparatus in the two-barrel type stereo scopic camera, the sizes of the right and left images at the time of zooming are always the same.

In accordance with a still further preferred embodiment of the present invention, the first and second zoom lens focal length changing means respectively comprise first and second zoom lens driving means for respectively moving the first and second zoom lenses between the telephoto end and the wide-angle end by electric power, the first and second zoom lens driving means respectively comprising pulse motors. The zoom lenses in the interlocked zooming apparatus are respectively moved by the pulse motors. Pulses can be sent to both the pulse motors such that the rates of changes in zoom ratios of right and left zoom lenses match. As a result, the sizes of images formed by both the cameras can be easily made uniform according to the changes in zoom ratios of both the zoom lenses.

The foregoing and other objects, features, aspects and advantages of the present invention will become more apparent from the following detailed description of the present invention when taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIGS. 6A and 6B to 12A and 12B are typical diagrams showing a mechanism for adjusting the sizes of specific images using an end image adjusting apparatus according to the present invention;

DESCRIPTION OF THE PREFERRED EMBODIMENTS

Description is now made on a stereo image pick up apparatus according to the present invention.

Figure 2:
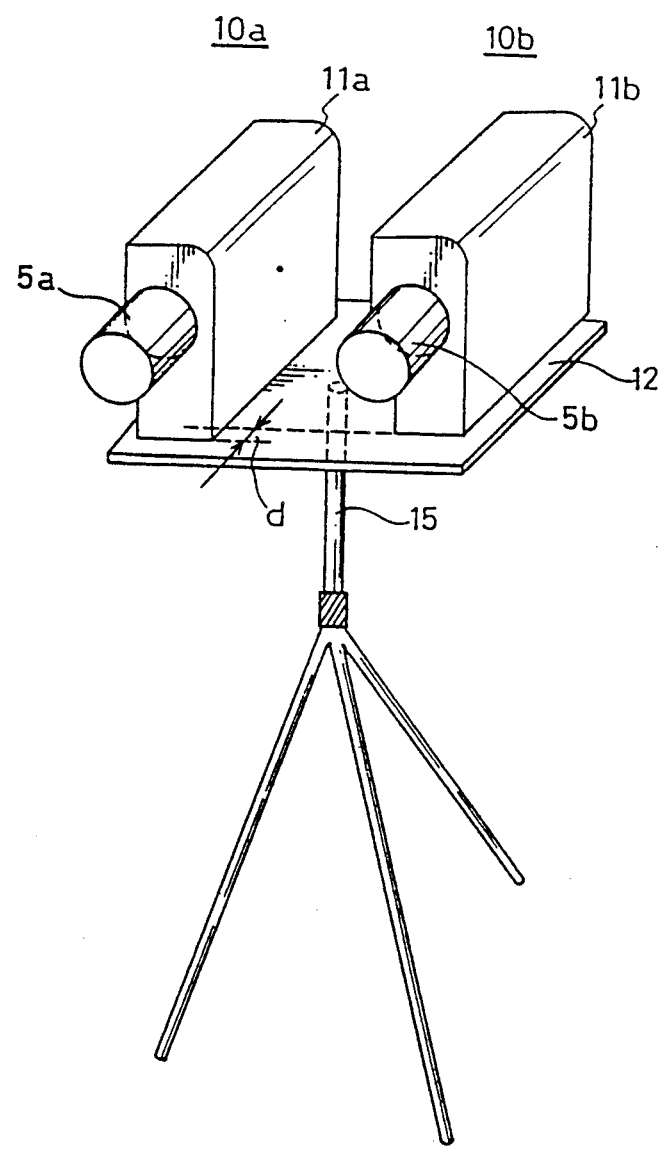
FIG. 2 is a perspective view showing a two-barrel type stereo scopic camera according to the present invention.

FIG. 2 is a perspective view showing a stereo image pick up apparatus to which an interlocked zooming apparatus according to the present invention is applied. Referring now to FIG. 2, the stereo image pick up apparatus according to the present invention comprises right and left cameras 10a and 10b for sensing an image of the same object, a tripod head 12 for holding the right and left cameras 10a and 10b, and a tripod 15 for supporting the tripod head 12. The right and left cameras 10a and 10b respectively comprise zoom lens portions 5a and 5b for forming an image of the object, and image recording portions 11a and 11b for recording the image formed by the zoom lens portions 5a and 5b. When a stereo image of the object is formed, a picture of the same object is taken by both the cameras 10a and 10b. In this case, control is performed by an interlocked zooming apparatus, as described in detail in the following, such that the sizes of images respectively formed by the right and left cameras 10a and 10b are the same.

When an object is moved in a lateral direction, the tripod head 12 is rotated with the right and left cameras 10a and 10b being fixed to the tripod head 12, so that both the cameras 10a and 10b are simultaneously rotated. Meanwhile, in the present embodiment, either one of the right and left cameras 10a and 10b constituting the stereo image pick up apparatus can be moved in the direction of the optical axis by d as represented in FIG. 2.

Figure 3:
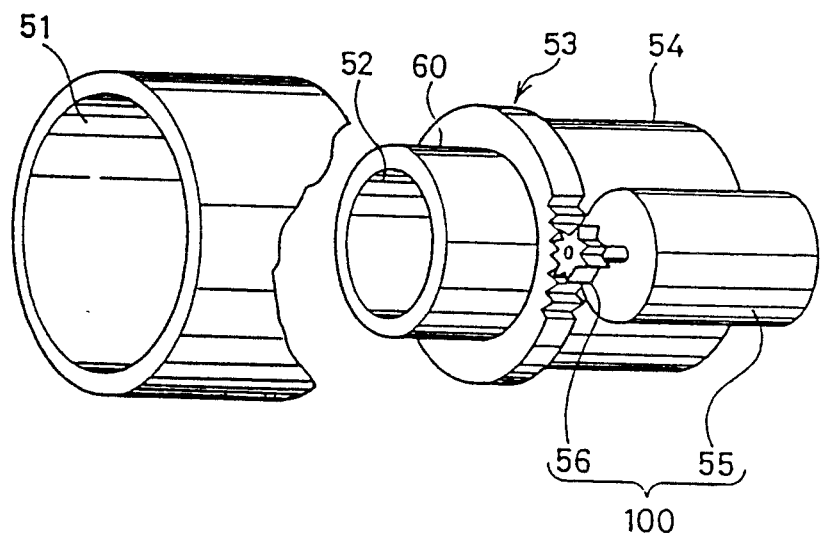
FIG. 3 is a typical diagram showing the details of a zoom lens.

FIG. 3 is a diagram for explaining the details of each of the zoom lens portions 5a and 5b described in FIG. 2. Referring to FIG. 3, each of the zoom lens portions 5a and 5b comprises a group of variator lenses 52 for varying the zoom ratio, a group of front lenses 51 for focusing an image formed by the group of variator lenses 52, and zoom means 100 for interlocking the group of variator lenses 52 with each other and the group 51 of front lenses and moving the same, thereby to adjust the focus while changing the zoom ratio. The zoom means 100 comprises a driving gear 53 for rotating the group of variator lenses 52 by a helicoid gear provided in a lens barrel 54, a zoom motor 55 for driving the driving gear 53, and a pinion gear 56 for transmitting the driving force of the zoom motor 55 to the driving gear 53.

Description is now made of the operations of the zoom lenses 5a and 5b. When the zoom ratio of an object is varied using each of the zoom lenses 5a and 5b, a predetermined signal is inputted to the zoom motor 55. The zoom motor 55 is rotated in the forward direction or the reverse direction in response to this signal, so that the driving gear 53 is rotated in the forward or reverse direction through the pinion gear 56, whereby the group of variator lens 52 is moved in a predetermined direction. Meanwhile, the zoom motor 55 is a stepping motor or a general DC motor as described below, the amount of the rotation thereof being surely controlled. In the above described manner, the size of an image is changed by changing the focal length of the group of variator lenses 52 and at the same time, the group of front lenses 51 is controlled by predetermined focusing means (not shown), so that a focused image is formed on the recording portions 11a and 11b in the video cameras 10a and 10b.

Figure 4A:
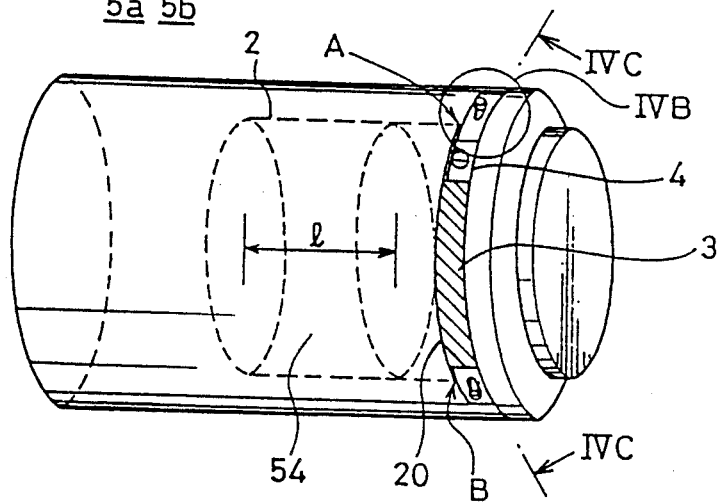
FIGS. 4A to 4C are typical diagrams showing a first mechanism for adjusting the sizes of images formed by right and left cameras in each of a telephoto end and a wide-angle end according to the present invention.

FIG. 4A is a perspective view showing each of the zoom lenses 5a and 5b for explaining the interlocked zooming apparatus according to the present invention. In FIG. 4A for explaining each of the zoom lenses 5a and 5b, only a portion related to the interlocked zooming apparatus is clearly shown.

Referring to FIG. 4A, a groove of variator lenses 52 in each of the zoom lenses 5a and 5b is moved by the length represented by 1 from the wide-angle end to the telephoto end. This movement is achieved by rotation of a zoom ring 3 along a cam groove provided in a cam barrel 2 provided in a lens barrel 54. A zoom ring stopper 4 is provided in one end of the zoom ring 3. The movement of the zoom ring stopper 4 is regulated by an aperture of a frame 20 for moving a zoom ring (referred to as zoom ring frame hereinafter) provided in one end of the lens barrel 54. More specifically, while the group of variator lenses 52 is moved by the length represented by l in FIG. 4A, the zoom ring 3 is rotated by the length r from A to B in FIG. 4A.

The interlocked zooming apparatus according to the present invention comprises an end image adjusting apparatus for making uniform the sizes of images formed by right and left zoom lenses in each of the telephoto end and the wide-angle end, and an automatic image magnification adjusting apparatus for automatically matching the rates of the changes in size of the images between the telephoto end and the wide-angle end.

There are two types of manners of making uniform the sizes of images formed by the zoom lenses 5a and 5b in each of the telephoto end and the wide-angle end and manners of automatically matching the rates of the changes in size of the images between the telephoto end and the wide-angle end. The manners will be described.

Description is now made of an end image adjusting apparatus for making uniform the sizes of images formed by zoom lenses in each of the telephoto end and the wide-angle end.

Figure 4B:
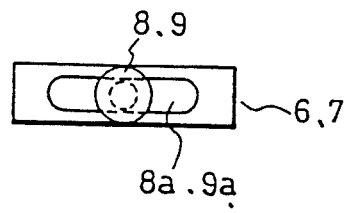
Figure 4C:
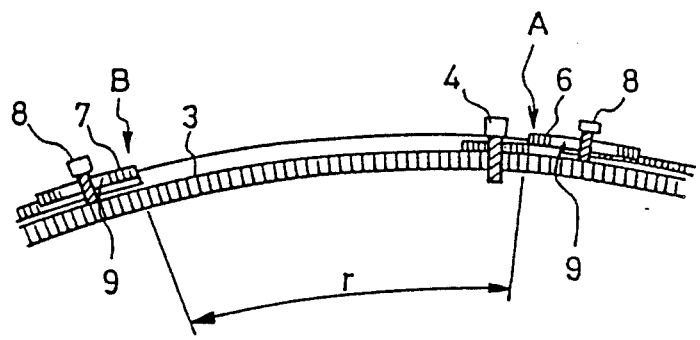

(1) First embodiment of end image adjusting apparatus:

Referring to FIG. 4A to 4C, description is made of a manner of making uniform the sizes of images formed by right and left zoom lenses in each of the telephoto end and the wide-angle end, according to the present invention.

FIG. 4B is a plan view showing a portion taken along a line IVB–IVB shown in FIG. 4A. Referring to FIG. 4B, an adjusting stopper 6 on the telephoto side and an adjusting stopper 7 on the wide-angle side for respectively adjusting the amount of rotation of a zoom ring 3 are provided in an end of the aperture of the zoom ring frame 20. Elongate holes 8a and 9a are provided in the adjusting stopper 6 on the telephoto side and the adjusting stopper 7 on the wide-angle side. The positions of the adjusting stopper 6 on the telephoto side and the adjusting stopper on the wide-angle side are finely adjusted by adjusting the positions of adjusting screws 8 and 9 in the elongate holes 8a and 9a.

FIG. 4C is a cross-sectional view showing a portion taken along a line IVC—IVC shown in FIG. 4A. Referring to FIG. 4C, a zoom ring stopper 4 is moved by rotation between the adjusting stopper 6 on the telephoto side and the adjusting stopper 7 on the wide-angle side. More specifically, the zoom ring 3 is moved by rotation between the adjusting stopper 6 on the telephoto side and the adjusting stopper 7 on the wide-angle side.

Description is now made of a manner of adjusting the sizes of images photographed by right and left cameras using the adjusting stoppers. When the sizes of the images formed by the right and left cameras in each of the telephoto end and the wide-angle end are adjusted, the images formed by the right and left cameras are displayed on a display screen (not shown). The positions of the adjusting stopper 6 on the telephoto side and the adjusting stopper 7 on the wide-angle side are adjusted such that the sizes of the images formed by the right and left cameras in each of the telephoto end and the wide-angle end displayed on the display screen become equal. After adjusting the positions of the adjusting stopper 6 on the telephoto side and the adjusting stopper 7 on the wide-angle side, the adjusting screws 8 and 9 are tightened, thereby to fix the positions of the adjusting stopper 6 on the telephoto side and the adjusting stopper 7 on the wide-angle side.

Figure 5:
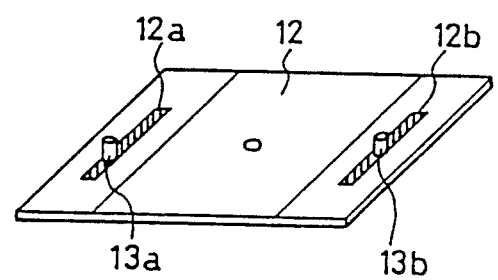
FIG. 5 is a perspective view showing a second mechanism for adjusting the sizes of images formed by two cameras in a telephoto end, according to the present invention.

(2) Second embodiment of end image adjusting apparatus:

Description is now made on an end image adjusting apparatus for making uniform the sizes of images in each of the telephoto end and the wide-angle end according to a second embodiment of the present invention. FIG. 5 is a perspective view showing a tripod head 12 shown in FIG. 2. Right and left cameras 10a and 10b are not mounted on the tripod head 12 to facilitate understanding of the embodiment. The tripod head 12 comprises a fixing screw 13a for fixing the right camera 10a, a fixing screw 13b for fixing the left camera 10b, and slide grooves 12a and 12b for moving the right and left cameras 10a and 10b in the direction of the optical axis.

When the sizes of images formed by the right and left cameras 10a and 10b using the end image adjusting apparatus according to the second embodiment of the present invention, either one of the right and left cameras 10a and 10b is fixed while the other camera is moved along either one of the grooves 12a and 12b. Consequently, the sizes of the images formed by the zoom lenses 5a and 5b in either one of the wide-angle end and the telephoto end can be made uniform. After the sizes of the images formed by the right and left cameras 10a and 10b in either one of the wide-angle end and the telephoto end are made uniform, the right and left cameras are fixed on the tripod head 12 using the fixing screws 13a and 13b in order to fix the right and left cameras 10a and 10b.

Meanwhile, the size of the image in the telephoto end (or the wide-angle end) on the opposite side of the wide-angle end (or the telephoto end) where the sizes of the image are adjusted is adjusted using the end image adjusting apparatus according to the first embodiment shown in FIG. 4A.

Figure 6A:
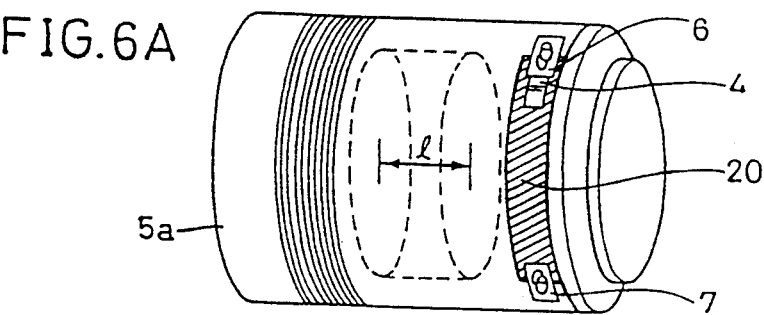
Figure 6B:
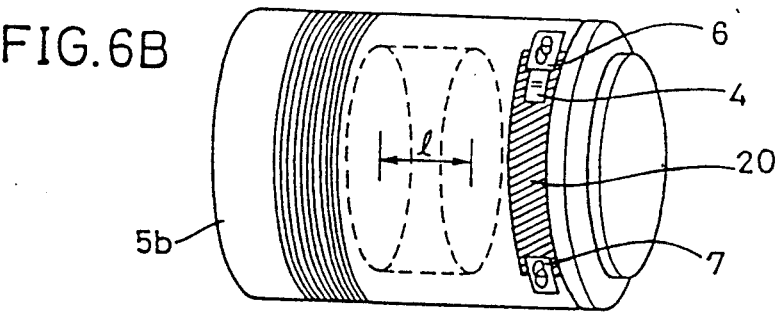

Referring now to FIGS. 6A and 6B to 12A and 12B, description is made of a manner of adjusting specific images in each of the telephoto end and the wide-angle end using the end image adjusting apparatus according to the above described first and second embodiments. FIGS. 6A and 6B are typical diagrams showing a manner of adjusting the sizes of images using the end image adjusting apparatus according the first embodiment of the present invention. FIG. 6A corresponds to the right zoom lens 5a, and FIG. 6B corresponds to the left zoom lens 5b. (In FIGS. 6A and 6B, A and B respectively correspond to the zoom lenses 5a and 5b.) The adjusting stoppers 6 and 7 shown in FIG. 4A are respectively provided in the wide-angle end and the telephoto end of a zoom ring frame 20 of each of right and left cameras (the adjusting stoppers 6 and 7 are referred to as an adjusting mechanism 14 hereinafter).

Figure 7A:
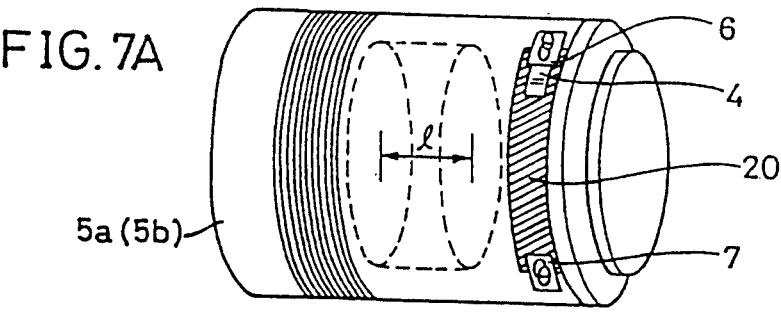
Figure 7B:
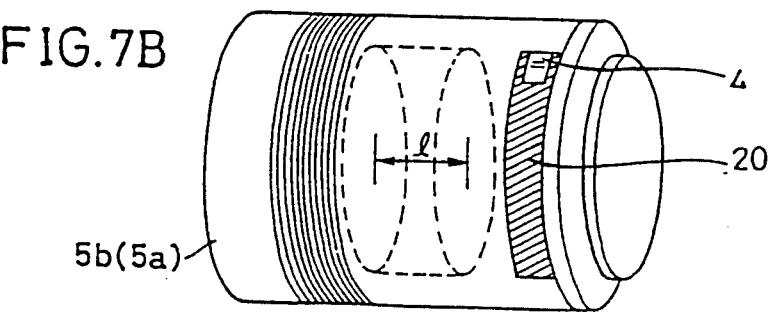

FIGS. 7A and 7B are typical diagrams showing another adjusting mechanism using the end image adjusting apparatus according to the first embodiment. In FIGS. 7A and 7B, the adjusting stoppers 6 and 7 shown in FIG. 4A are respectively provided in the wide-angle end and the telephoto end of the zoom ring frame 20 of one of cameras, while the adjusting mechanism 14 is not provided in the zoom ring frame 20 of the other camera.

Figure 8A:
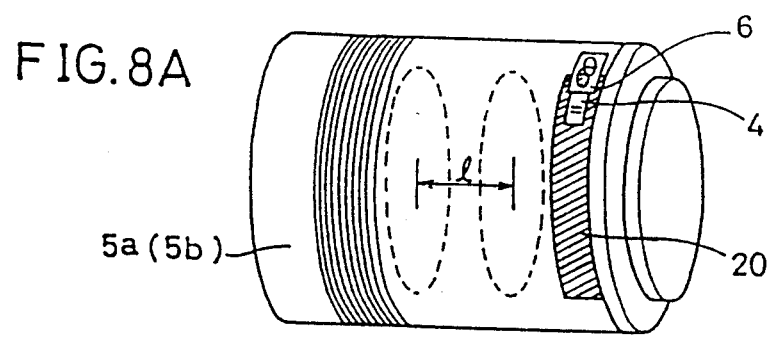
Figure 8B:
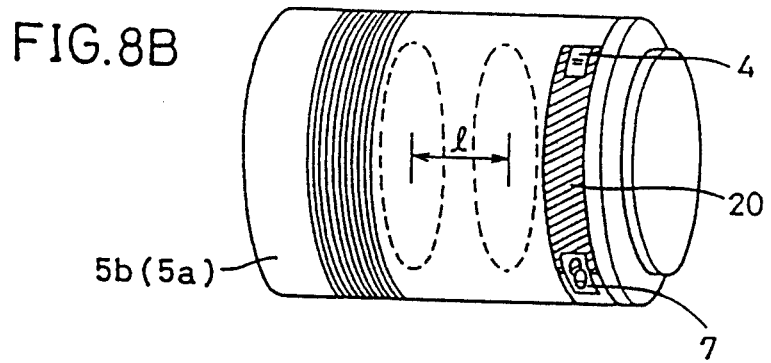

In FIGS. 8A and 8B, the adjusting mechanism 14 shown in FIG. 4A is provided in the wide-angle end of the zoom ring frame 20 of one of zoom lenses, while the adjusting mechanism 14 shown in FIG. 4A is provided in the telephoto end of the zoom ring frame 20 of the other zoom lens.

Figure 9A:
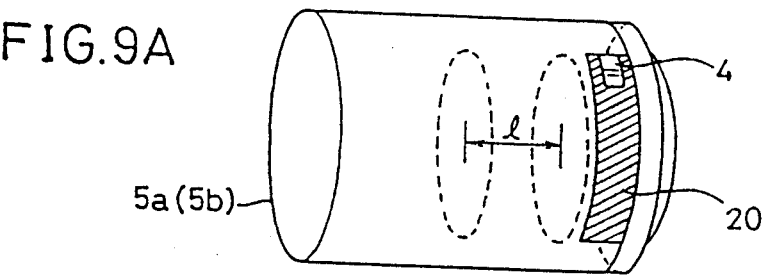
Figure 9B:
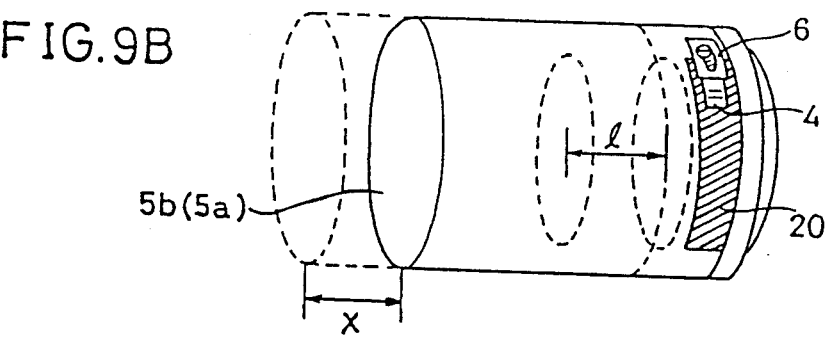
Figure 10A:
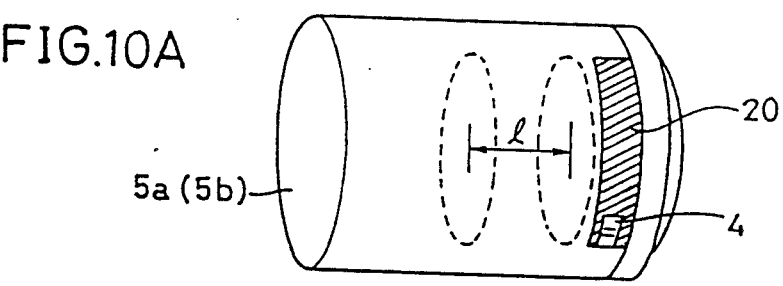
Figure 10B:
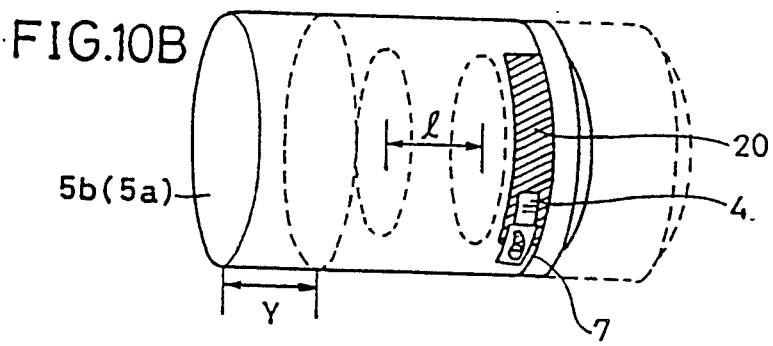
Figure 11A:
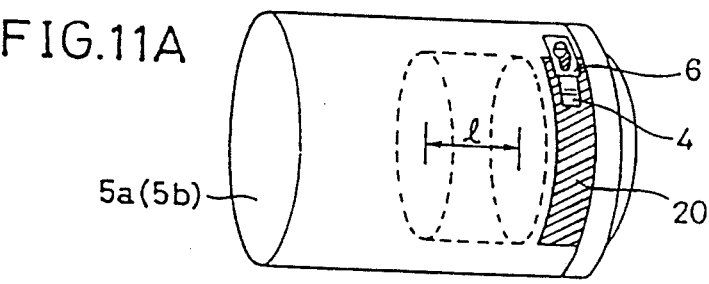
Figure 11B:
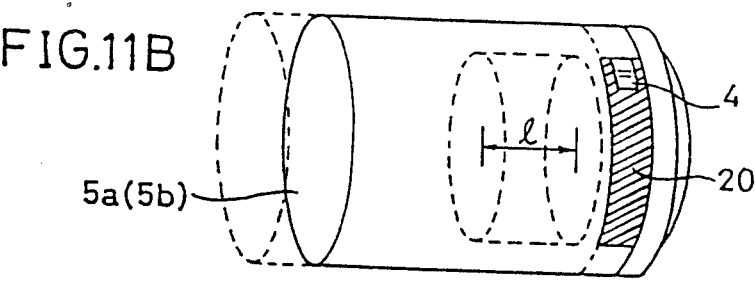
Figure 12A:
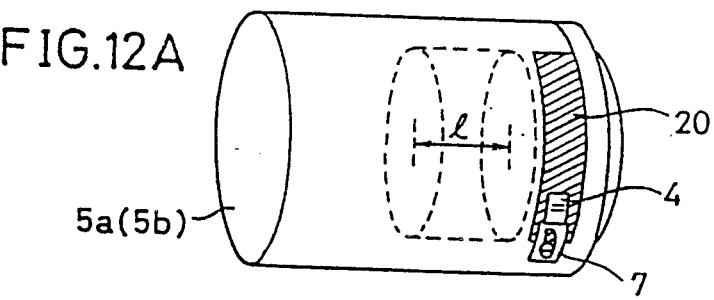
Figure 12B:
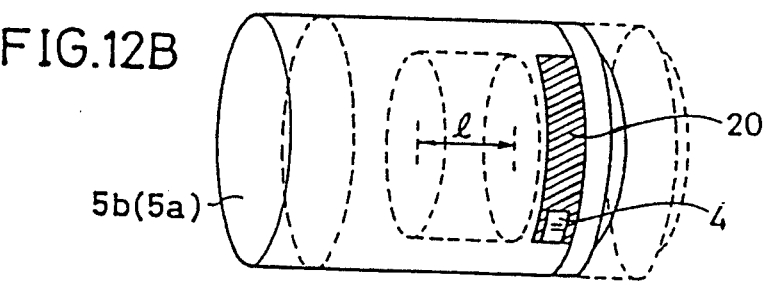

FIGS. 9A and 9B and FIGS. 10A are typical diagrams showing a mechanism for adjusting the sizes of second specific images, which is a combination of the first and second embodiments of the present invention. Referring to FIGS. 9A and 9B, the adjusting mechanism 14 shown in FIG. 4A for making uniform the sizes of right and left images is provided in the telephoto end of the zoom ring frame 20 of only one of cameras. The wide-angle end thereof is adjusted by the mechanism for moving the camera body shown in FIG. 5 backward and forward by X. Therefore, the sizes of the images formed by the right and left cameras in each of the wide-angle end and the telephoto end are made uniform. On the contrary, as shown in FIGS. 10A and 10B, the telephoto end may be adjusted by the mechanism for moving the camera body shown in FIG. 5 backward and forward by Y, and the adjusting mechanism 14 shown in FIG. 4A for making uniform the sizes of the right and left images may be provided on the wide-angle end of the zoom ring frame 20, so that the sizes of the images formed by the right and left cameras in each of the wide-angle end and the telephoto end may be made uniform.

In FIGS. 11A and 11B and FIGS. 12A and 12B, the adjusting mechanism 14 shown in FIG. 4A may be provided on the telephoto end (or the wide-angle end) of the zoom ring frame 20 of one of the cameras while a mechanism for moving the camera body shown in FIG. 5 backward and forward may be provided in the other camera, so that the sizes of the images formed by the right and left cameras in each of the wide-angle end and the telephoto end may be made uniform.

Description is now made on the automatic image magnification adjusting apparatus according to the present invention. The automatic image magnification adjusting apparatus is used for automatically making uniform the sizes of the images formed by the right and left zoom lenses 5a and 5b according to the zoom ratio. The present invention includes two embodiments of the automatic image magnification adjusting apparatus. In the first embodiment, a pulse motor is used as a zoom motor. In the second embodiment, a motor other than the pulse motor, such as a DC motor, may be used as the zoom motor.

Figure 13:
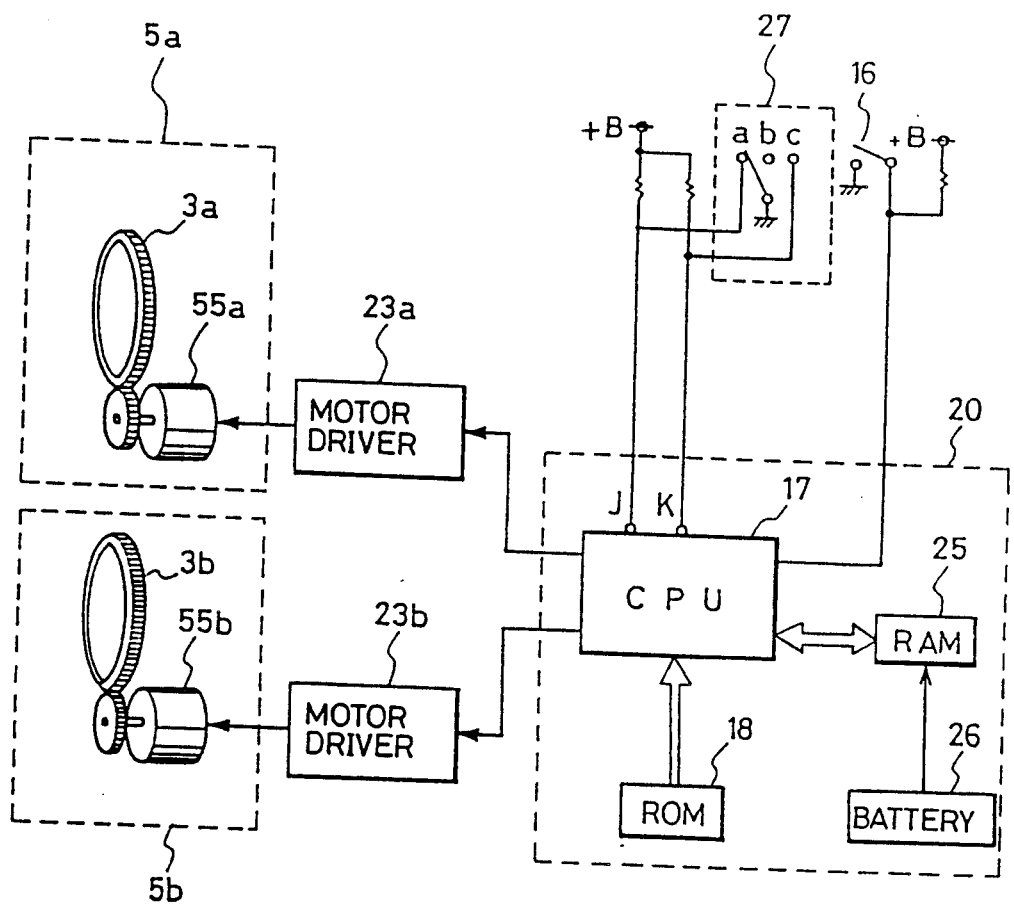
FIG. 13 is a block diagram showing a controlling method of an interlocked zooming apparatus according to the present invention.

(3) First embodiment of an automatic image magnification adjusting apparatus:

FIG. 13 is a block diagram showing the automatic image magnification adjusting apparatus according to a first embodiment of the present invention. Referring to FIG. 13, the automatic image magnification adjusting apparatus according the first embodiment of the present invention comprises right and left zoom lenses 5a and 5b for sensing an image of the same object, right and left motor drivers 23a and 23b for respectively outputting driving signals to the right and left zoom lenses 5a and 5b, a control portion 20 for outputting to the motor drivers 23a and 23b control signals for respectively driving the zoom lenses 5a and 5b, a zoom switch 27 for commanding the control portion 20 to start zooming, and a reset switch 16 for resetting the operation of the control portion 20. The zoom lenses 5a and 5b respectively comprise zoom rings 3a and 3b for changing the sizes of images by changing the focal length of a groove of variator lenses and right and left zoom motors 55a and 55b for respectively rotating the zoom rings 3a and 3b, as described in FIG. 3. Signals for driving the zoom motors are respectively outputted to the zoom motors 55a and 55b from the motor drivers 23a and 23b. Meanwhile, in the first embodiment of the present invention, each of the zoom motors 55a and 55b is a pulse motor. The control portion 20 comprises a CPU 17 for controlling an interlocked zooming operation, a ROM 18 and a RAM 25 for storing predetermined data, and a battery 26 for supplying power for holding the data stored in the RAM 25. The zoom switch 27 comprises three contacts a, b and c. The focal length of each of the zoom lenses is moved to the telephoto end if the switch a is turned on while being moved to the wide-angle end if the switch c is turned on, and the operation is stopped if the switch b is turned on. Meanwhile, B represents a power source.

Description is now made of the operation of the interlocked zooming apparatus according to the present invention. When the reset switch 16 is depressed, an "L" level signal is inputted to the CPU 17. The CPU 17 controls motor drivers 23a and 23b to move the zoom rings 3a and 3b from the wide-angle end to the telephoto end or from the telephoto end to the wide-angle end at the same pulse rate by the pulse motors 55a and 55b in response to an instruction from the ROM 18. On this occasion, the number of pulse steps of each of the right and left cameras required for the movement is counted by a counter contained in the CPU 17. Meanwhile, the sizes of the right and left images formed by the right and left zoom lenses in each of the wide-angle end and the telephoto end have been made uniform in advance by using the end image adjusting apparatus of the first embodiment (FIGS. 4A–4C).

Figure 14:
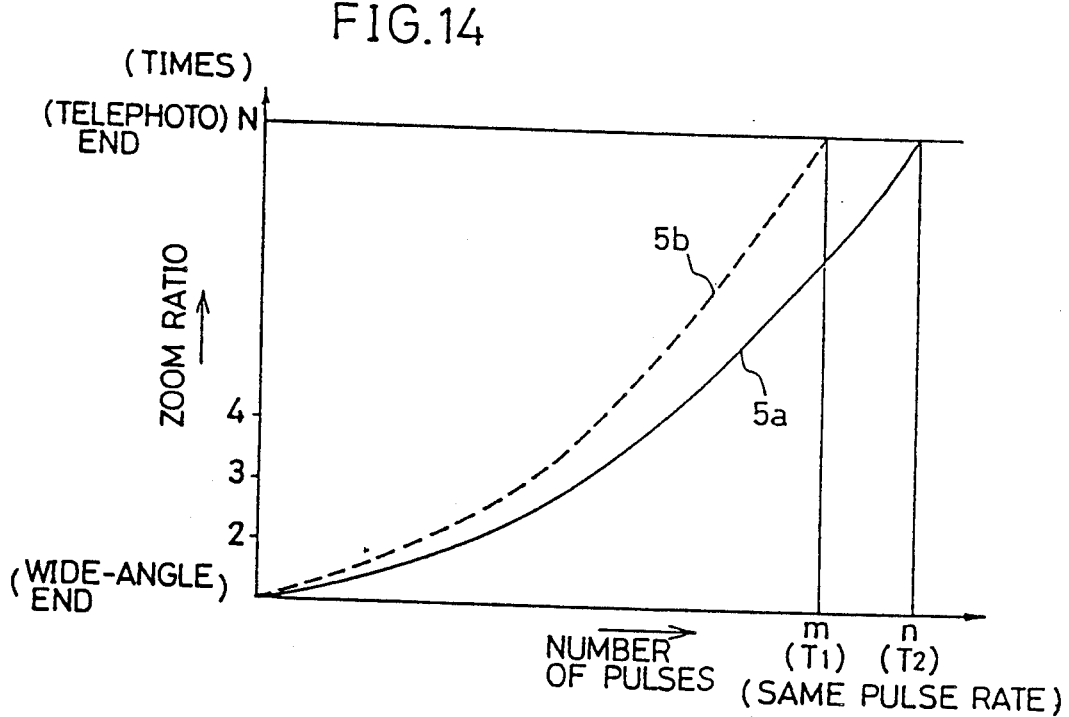
FIGS. 14 to 16 are diagrams showing curves respectively representing the change in zoom ratio of right and left cameras according to the present invention.

FIG. 14 shows curves showing the change in zoom ratios of the right and left cameras.

Referring to FIG. 14, n pulses and m pulses must be respectively applied to the zoom motors in the right and left cameras for the zoom lenses to reach the telephoto end from the wide-angle end.

The CPU 17 samples the x-axis shown in FIG. 14, to cause data in the direction of the y-axis at the time of sampling to be stored in the RAM 25. The CPU 17 adjusts the rate of pulses applied to the pulse motors in the right and left cameras on the basis of the stored data. As a result, the numbers of pulses and the zoom ratios of both the cameras approximately match, respectively, as shown in FIG. 15 (a curve on the side of the left camera) or FIG. 16 (a curve on the side of the right camera.

Figure 15:
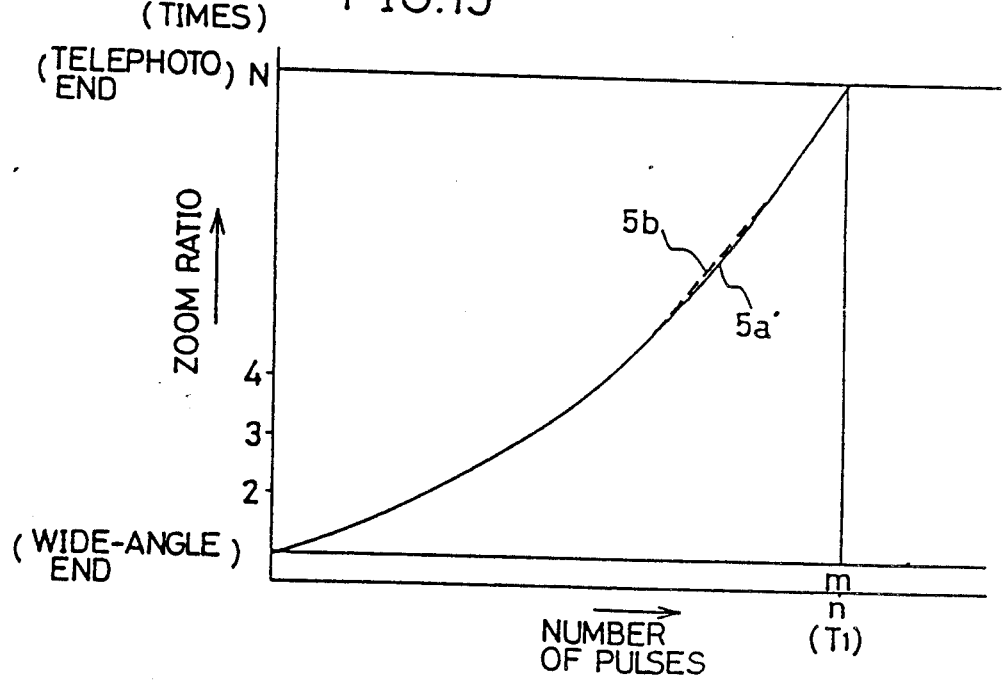
Figure 16:
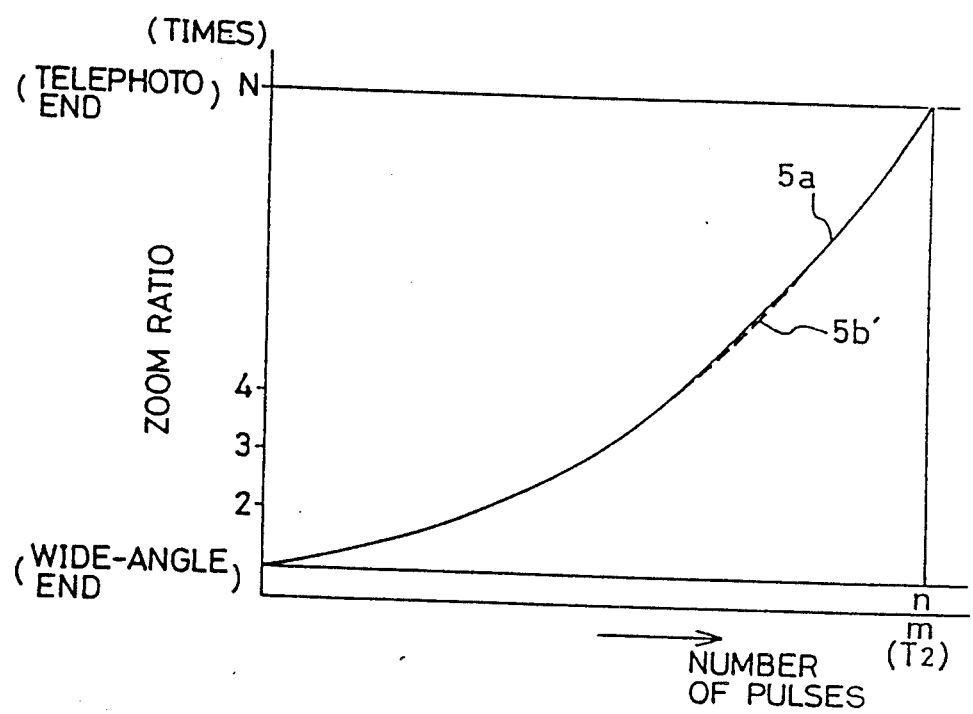

In FIGS. 15 and 16, a curve $5a'$ ($5b'$) is a curve obtained by matching the curve $5a$ ($5b$) and the curve $5b$ ($5a$).

Description is now made on one example of this calculation. In FIG. 14, assuming that times required for counting the numbers m and n of pulses are respectively $T_1$ and $T_2$, the following equation holds because the right and left zoom lenses are moved at the same pulse rate in FIG. 14:

$$m/T_1 = n/T_2$$

Additionally, if the right and left zoom lenses respectively reach the telephoto end from the wide-angle end at the time $T_1$ as shown in FIG. 15, a pulse rate X of the right camera is as follows:

$$n/X = T_1$$

$$X = n/T_1$$

The result of this calculation is stored in the RAM 25, and the stored content is backed up by the battery 26 even if the power supply is turned off.

In the above described manner, the sizes of the right and left images formed by the zoom lenses are automatically made uniform (referred to as auto-tracking hereinafter) and the same, the zoom switch 27 is switched to the contact a when it is zoomed in from the wide-angle end to the telephoto end, an "L" level signal is applied to a terminal J of the CPU 17. It is necessary that the zoom switch 27 is switched to the contact c when it is zoomed out from the telephoto end to the wide-angle end. Consequently, an "L" level signal is applied to a terminal K of the CPU 17, so that the CPU 17 drives the right and left pulse motors 55a and 55b (see FIG. 13) in a period during which the "L" level signal is applied such that the sizes of the right and left images are made uniform based on data (exponential function data) stored in the RAM 25.

Figure 17:
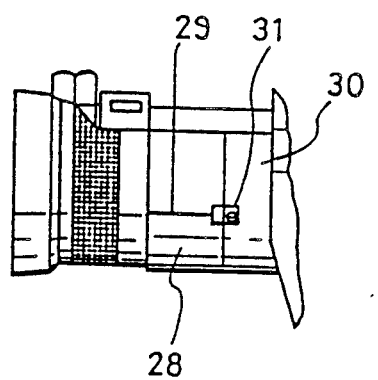
FIG. 17 is a diagram showing a specific example of a telephoto end or a wide-angle end of a zoom ring according to the present invention.

Description is further made of the first embodiment shown in FIG. 13. FIG. 17 is a diagram showing a specific example of a manner of detecting the telephoto end and the wide-angle end of the zoom ring, FIG. 18 is a diagram showing the details of the first embodiment shown in FIG. 13, and FIG. 19 is a flow chart of FIG. 18.

Referring to FIG. 17, a fixed index ring 28 is painted in black and a white index line 29 is drawn thereon. A sensor 31 for sensing a white line is attached to a zoom ring 30 with a bis, which together with the zoom ring 30, is moved. Thus, when the sensor 31 senses the index line 29, it is determined that the zoom ring 30 reaches the telephoto end or the wide-angle end.

In the example described in FIG. 13, at the same time that the zoom ring 30 starts in the wide-angle end of the zoom ring frame and reaches the telephoto end, the sensor 31 senses the index line 29, to inform the CPU that the zoom ring 30 reaches the telephoto end.

Figure 18:
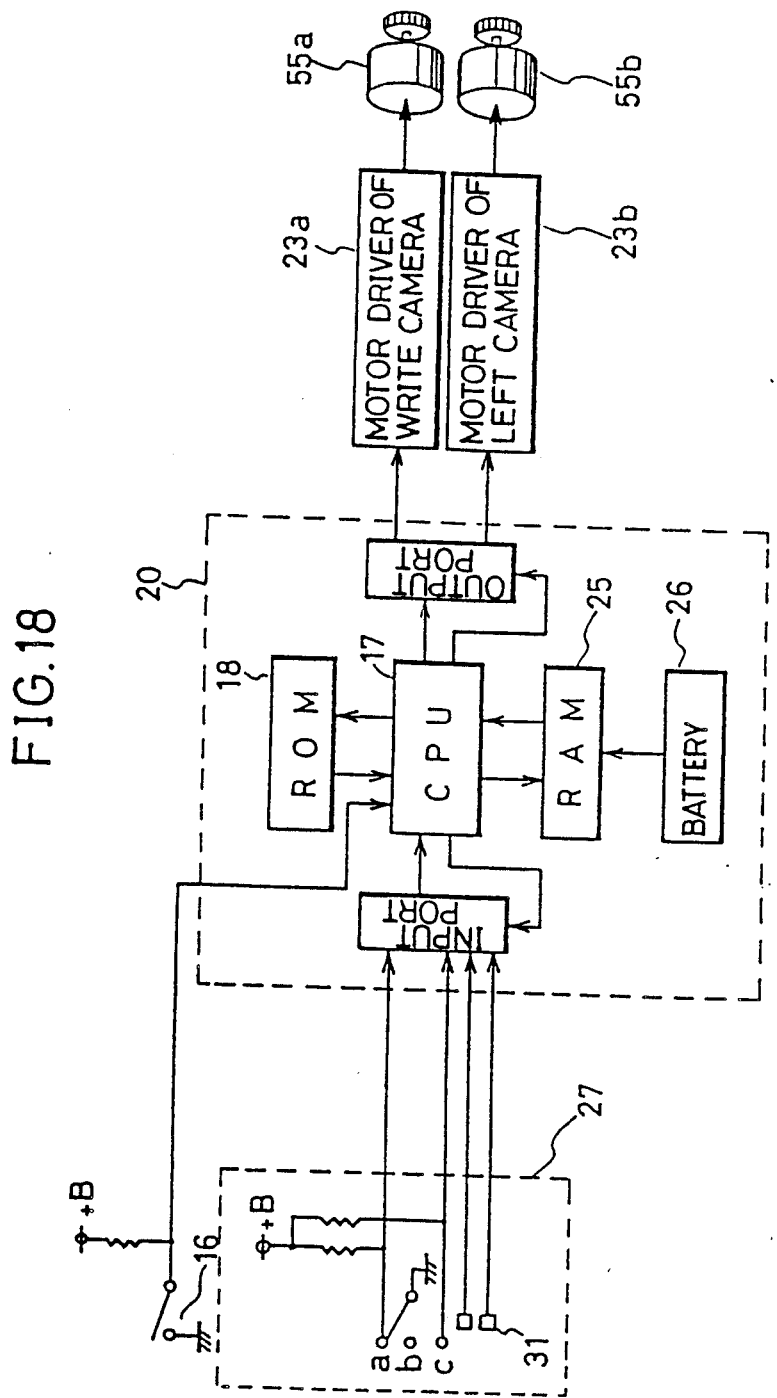
FIG. 18 is a diagram showing the details of the block diagram of FIG. 13.
Figure 19:
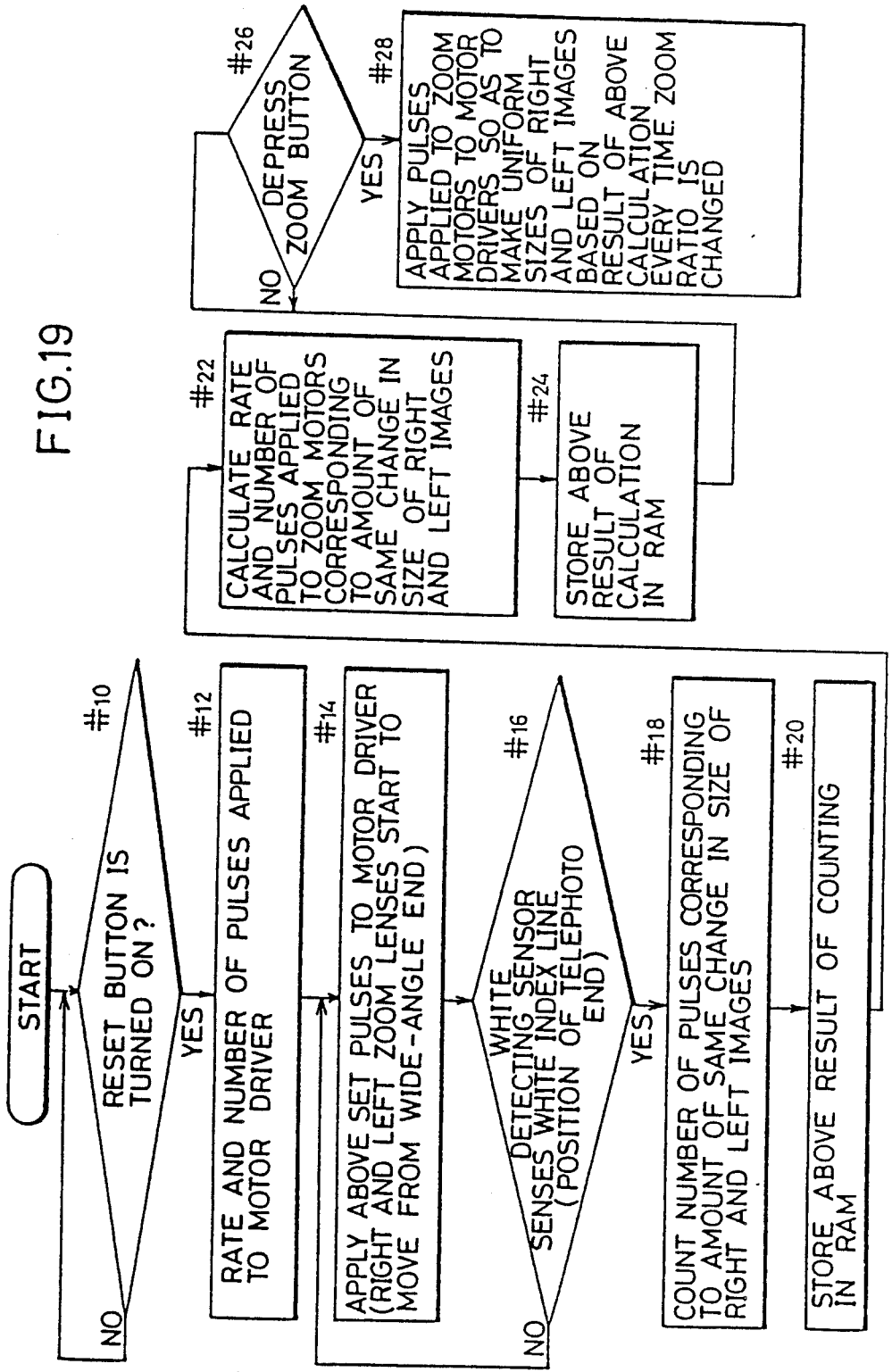
FIG. 19 is a flow chart showing control of an interlocked zooming apparatus according to the present invention.

Referring now to FIGS. 18 and 19, description is made of a specific operation of the CPU 17.

When a reset switch 16 is turned on (in the step #10), the CPU 17 applies pulses having the same rate to motor drivers 23a and 23b (in the steps #12 and #14), thereby to move zoom lenses of the right and left cameras from the wide-angle end to the telephoto end. When sensors 31 respectively attached to zoom rings of the right and left cameras respectively detect the telephoto end (in the step #16), applications of the pulses to the drivers 23a and 23b are respectively stopped. On this occasion, the number of pulses corresponding to the amount of the same change in size of the right and left images is counted (in the step #18), the result of the counting being stored in a RAM 25 (in the step #20). Then, the rate and the number of pulses applied to the zoom motors corresponding to the amount of the same change in size of the right and left images are calculated (in the step #22), the result of the calculation being stored in the RAM 25 (in the step #24). When a zoom button 27 is turned on (in the step #26), the pulses applied to the right and left zoom motors are applied to the motor drivers 23a and 23b so as to make uniform the sizes of the right and left images based on the result of the calculation stored in the RAM 25 every time the zoom ratio is changed (in the step #28).

Figure 20:
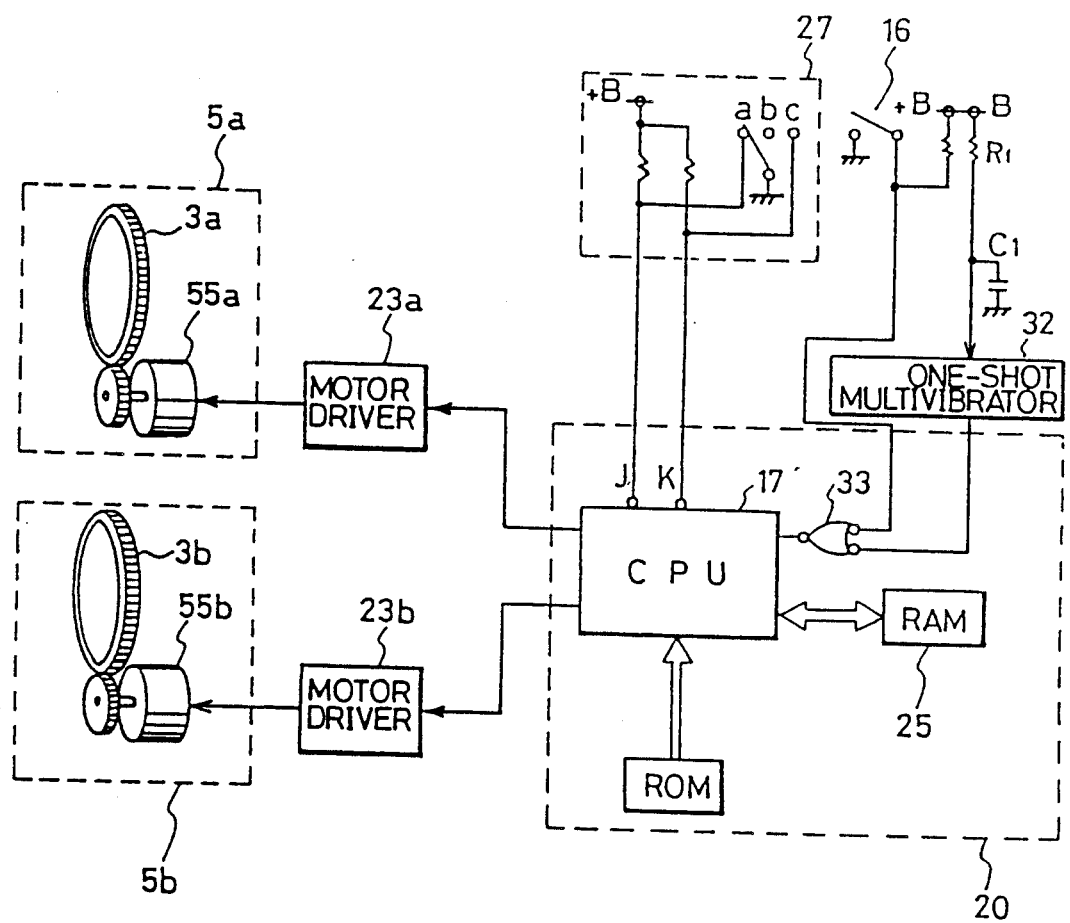
FIG. 20 is a block diagram showing a controlling method of the interlocked zooming apparatus according to the present invention.

With reference to the embodiment shown in FIG. 13, FIG. 20 shows an example in which the sizes of the right and left images can be automatically made uniform every time the zoom ratio is changed at the time of operating a zoom button when the power supply is turned on, other than the time of operating a reset switch 16.

In FIG. 20, when the power supply is turned on, a pulse integrated by a resister R1 and a capacitor C1 is inputted to a one-shot multivibrator 32. The pulse is inputted from an OR gate 33 to CPU 17 after a waveform thereof is shaped and the pulse width thereof is increased. A signal from a reset switch 16 goes into the other input terminal of the OR gate 33. Thus, at the time of turning on the power supply or the time of operating the reset switch 16, the same operation as that in the embodiment shown in FIG. 13 is performed by the CPU 17. Meanwhile, since the above described operation is performed at the time of turning on the power supply, a back up battery is not required in a RAM 25.

Description is now made on an embodiment suitable for a case in which there is a possibility that the mechanically adjusted value is not satisfactory due to the effect exerted by a change in temperature and humidity (for example, a picture is taken in a cold region after a picture is taken in a hot and humid region); the effect exerted by meteorological conditions such as a strong wind, and the change of a place where a picture is taken, changing of a scene to be photographed, or the like. The sizes of the right and left images formed by an operation of the zoom button of a two-barrel type stereoscopic camera using the above described means every time the zoom ratio is changed are made uniform by interlocking cameras constituting the two-barrel type stereo scopic camera with each other.

First, the sizes of the right and left images formed by zoom lenses in each of the wide-angle end and the telephoto end are adjusted using the mechanism adjusting means shown in FIGS. 4A-4C, the amount of the same change in size of the right and left images is measured by an operation button included in the automatically adjusting means shown in FIG. 13, and the sizes of the images can be automatically adjusted according to the zoom ratio.

After the above described setting is terminated once, if the mechanically adjusted value shown in FIGS. 4A-4C is not satisfactory due to, for example, the effect exerted by the change in temperature of a place where a picture is taken, a strong wind or the like and movement of a place where a picture is taken, the zoom rings of the cameras must be adjusted again in the wide-angle end and the telephoto end. However, the range which can be adjusted by the movement of the zoom rings is narrow. Therefore, the present embodiment uses means for adjusting the position of a camera, shown in FIG. 5, capable of moving backward and forward the position or positions of one of cameras or both the cameras, in addition to the mechanism adjusting means shown in FIGS. 4A to 4C.

Figure 1:
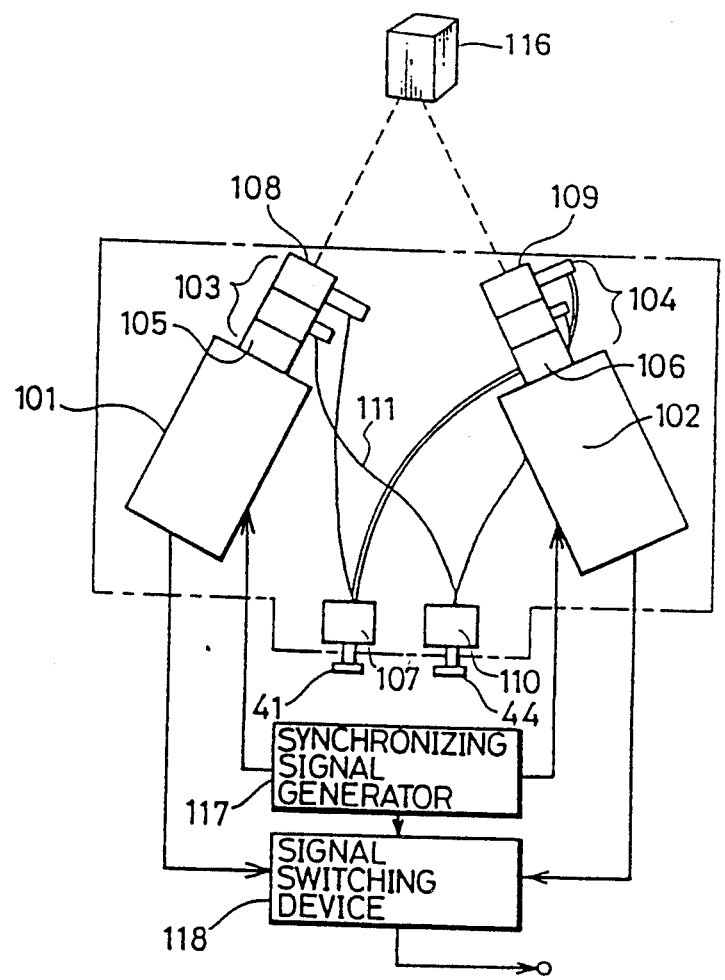
FIG. 1 is typical diagram showing a conventional image pick up apparatus using two cameras.

In the above described manner, even if the mechanically adjusted value adjusted by the mechanism shown in FIG. 1 is not satisfactory, the error of the above described adjustment can be simply corrected by adjustment made by moving backward and forward the position or positions of one of the cameras or both the cameras and data stored in the RAM 25 backed up by the battery 26 shown in FIG. 10.

Figure 21A:
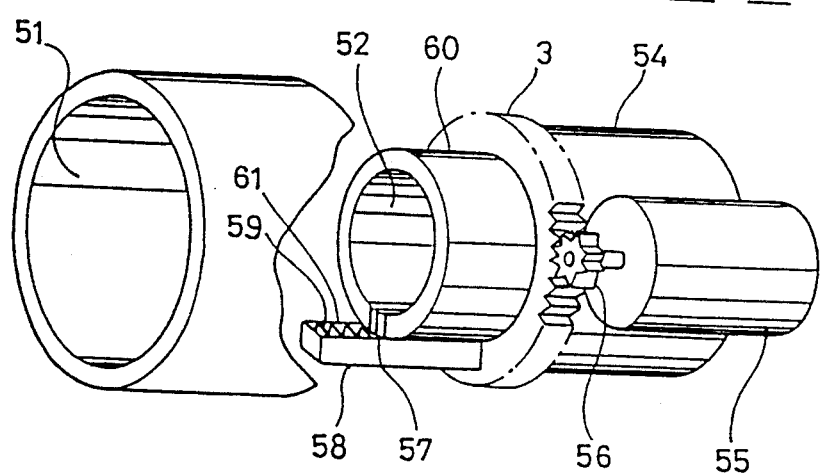
FIG. 21A and 21B are typical diagrams for explaining the second embodiment for adjusting the sizes of images formed by right and left cameras according to the present invention.
Figure 21B:
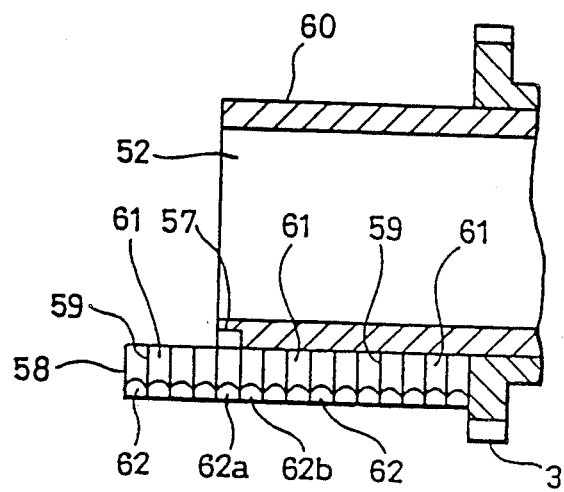

(4) Second embodiment of automatic image magnification adjusting apparatus:

FIG. 21A is a perspective view showing a main part of an automatic image magnification adjusting apparatus according to a second embodiment of the present invention, and FIG. 21B is a cross-sectional view in which the zoom lens shown in FIG. 21A is cut by a surface including the optical axis. FIG. 21A is almost the same as the perspective view of the zoom lens shown in FIG. 3 and the same portions have the same reference numerals and hence, the description thereof is omitted.

The zoom lens shown in FIG. 21A comprises a photo sensor 57 provided in a front end of a group of variator lenses 52 and a diode array 58 aligned in the direction of an optical axis of the group of variator lenses 52, unlike the zoom lens shown in FIG. 3.

Referring to FIG. 21B, the diode array 58 comprises a plurality of miniaturized light emitting diodes 62 successively aligned and partitions 59 provided for respectively partitioning the light emitting diodes 62, whereby the diode array 58 is divided into a plurality of small chambers 61. Increasing numbers starting with 0 are assigned to the plurality of light emitting diodes 62 back from a group of front lenses 51 corresponding to the positions thereof. The length of the photo sensor 57 embedded in a lower portion of a lens barrel 60 in the direction of the optical axis is approximately the same as the length of the small chambers 61 in the direction of the optical axis. The photo sensor 57 can receive only light of the light emitting diode 62 provided in the corresponding small chamber 61.

Meanwhile, the diode array 58 can be slightly moved in the direction of the optical axis so that the difference in zoom ratio between the right and left zoom lenses caused by variation in optical part at the time of the manufacture can be compensated by the movement of the diode array 58.

Figure 22:
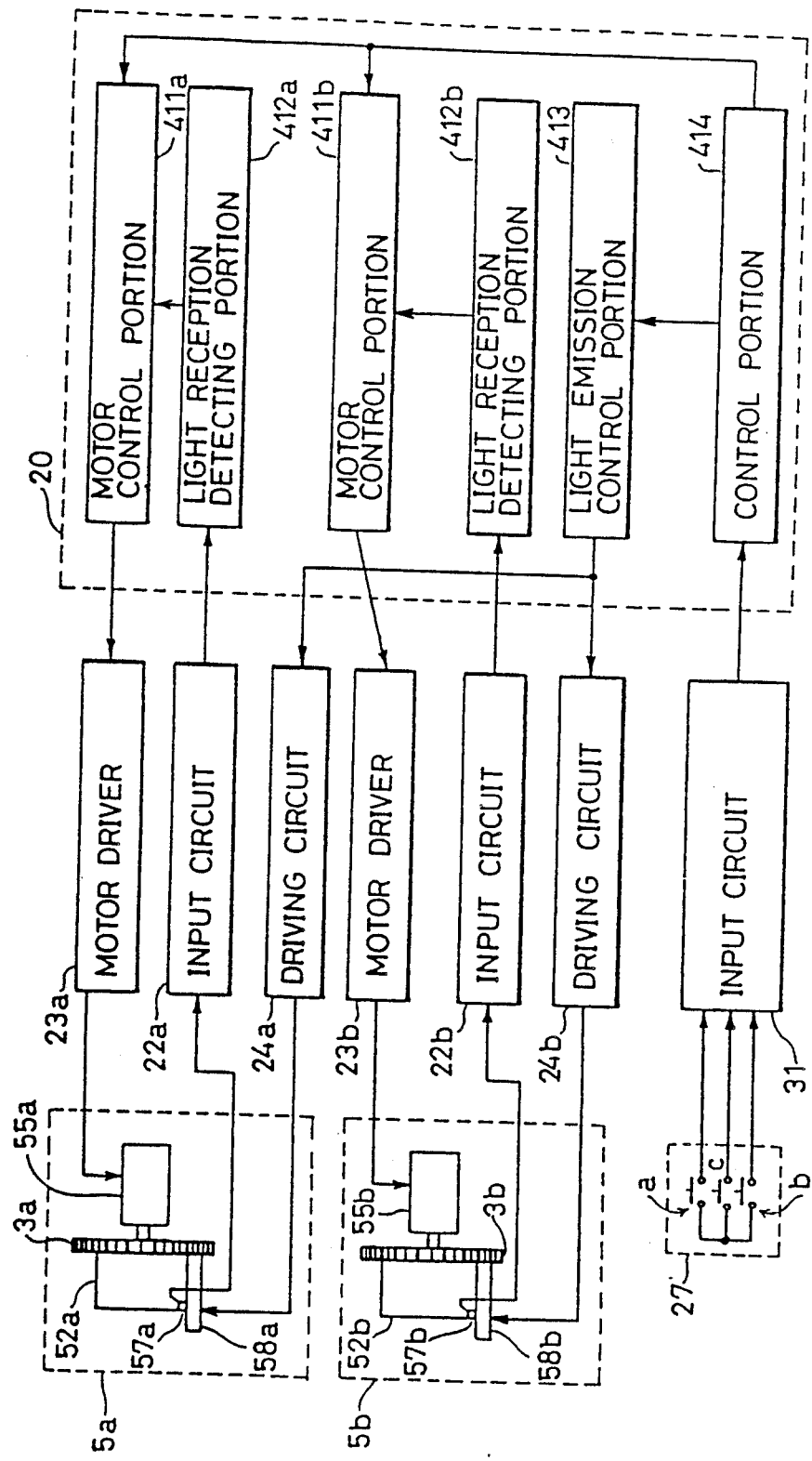
FIG. 22 is a block diagram showing an electrical structure of a second automatic image magnification adjusting apparatus according to the present invention.

FIG. 22 is a block diagram showing an electrical structure of a second automatic image magnification adjusting apparatus according to the present invention, which corresponds to the first automatic image magnification adjusting apparatus shown in the block diagram of FIG. 13.

Referring to FIG. 22, the second automatic image magnification adjusting apparatus according to the present invention comprises right and left zoom lenses 5a and 5b, motor drivers 23a and 23b for respectively driving the right and left zoom lenses 5a and 5b, a control portion 20 for controlling operations of the right and left zoom lenses 5a and 5b, a zoom switch 27 for starting or stopping the operations of the zoom lenses 5a and 5b, and an input circuit 31 for inputting a signal from the zoom switch 27 to the control portion 20. The zoom lenses 5a and 5b respectively comprise groups of variator lenses 52a and 52b for each varying the magnification of an image by changing the focal length, zoom motors 55a and 55b for respectively driving the groups of variator lenses 52a and 52b, photo sensors 57a and 57b respectively provided in front ends of the groups of variator lenses 52a and 52b, and diode arrays 58a and 58b respectively provided along the direction of the optical axis of the groups of variator lenses 52a and 52b. Meanwhile, in the automatic image magnification adjusting apparatus according to the second embodiment, each of the zoom motors 55a and 55b may be an ordinary DC motor other than a pulse motor, unlike the case of the first embodiment.

The control portion 20 comprises motor control portions 411a and 411b for respectively controlling the zoom motors 55a and 55b for respectively moving the right and left zoom lenses 5a and 5b, light reception detecting portions 412a and 412b for respectively receiving signals from the photo sensors 57a and 57b through input circuits 22a and 22b, a control portion 414 for outputting signals for moving the groups of variator lenses 52a and 52b to a position to be a predetermined focal length in response to a signal indicating the zoom direction of the zoom motors inputted through the input circuit 31, and a light emission control portion 413 for respectively transmitting the control signal from the control portion 414 to the diode arrays 58a and 58b through the driving circuits 24a and 24b to cause the diode in a predetermined position to emit light. The component of the zoom switch 27 is the same as that in FIG. 13 and hence, the description thereof is omitted.

In FIG. 22, the control portion 20 enclosed by a broken line is operated by a software constituted by a microcomputer comprising a CPU, a ROM, a RAM and the like, as shown in FIG. 13.

An output of the photo sensor 57 (subscripts a and b corresponding to the right and left cameras are omitted hereinafter) is sent out to the light reception detecting portion 412 through the input circuit 22, and an output of the light emission control portion 413 is lead to the diode array 58 through the driving circuit 24. An output of the motor control portion 411 is sent out to the zoom motor 55 through the motor driver 23.

An output of the zoom switch 27 provided in an operating portion of the camera body (not shown) is led to the control portion 414 through the input circuit 31.

An output for control is sent out to the light emission control portion 413 and the motor control portion 411 from this control portion 414. An output from the light reception detecting portion 412 is applied to the motor control portion 411.

Referring now to FIG. 21A, description is made of the automatic image magnification adjusting apparatus according to the second embodiment of the present invention.

When a zoom motor 55 is rotated and a zoom ring 3 is rotated, the group of variator lenses 52 is moved in the direction of the optical axis by a helicoid in a lens barrel 54. Therefore, the focal lengths of the first and second zoom lenses 5a and 5b are changed, so that the zoom ratio is varied. This zoom ratio is increased as the group of variator lenses 52 is moved to the side of the lens barrel 54 at the back thereof while being decreased as it is moved to the side of the lens of front lenses 51. In addition, a light emitting diode 62 to be lighted is changed as the group of variator lenses 52 is moved. The light emitted by the assigned light emitting diode 62 is received by the photo sensor 57 provided in the front portion of the lens barrel 60 and the lower portion of the group of front lenses 51, thereby the position of the group of variator lenses 52 is decided.

Meanwhile, in the second embodiment, it is assumed that the relation between the zoom ratio and the distance of movement between the two zoom lenses has been adjusted in advance as shown in FIGS. 15 and 16.

Figure 23:
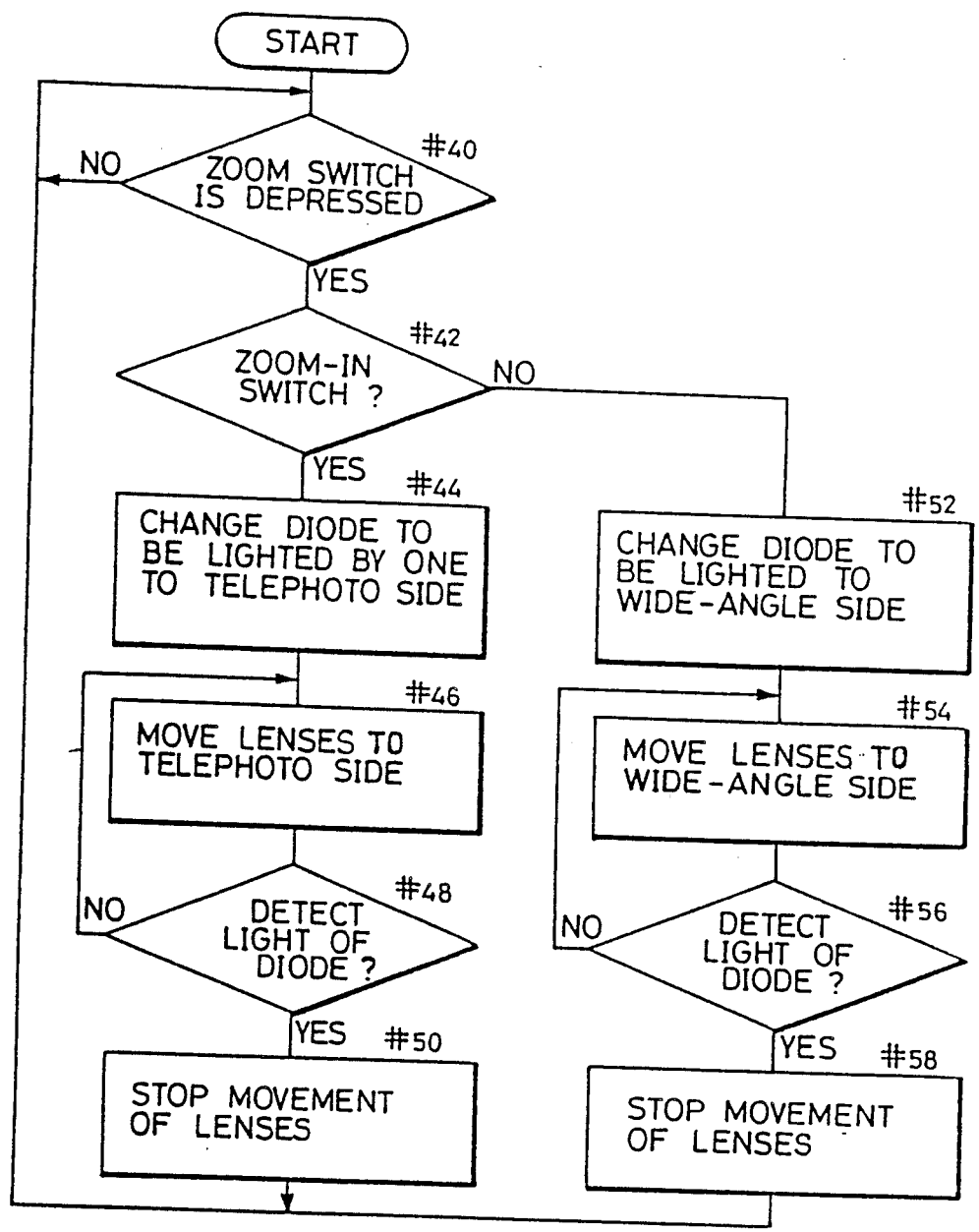
FIG. 23 is a flow chart showing control of the controlling apparatus shown in FIG. 22.

FIG. 23 is a flow chart showing an operation of the control portion 20.

When the necessity of change in zoom ratio arises, the zoom switch 27 provided in the operating portion is operated. Description is now made, by way of example, of an operation which occur when a switch a for indicating the increase in the zoom ratio is depressed.

It is determined by the control portion 414 through the input circuit 31 that the zoom switch 27 is depressed (in the step #40). Then, it is determined which of switches a and b in the zoom switch 27 is depressed (in the step #42). Since the switch a for indicating the increase in zoom ratio is now depressed, the program proceeds to the step #44 subsequently to the step #42.

The control portion 414 instructs the light emission control portion 413 to change a light emitting diode 62 to be lit. Therefore, when the group of variator lenses 52 is in the position shown in, for example, FIG. 21B, the stop of light emission of the light emitting diode 62a (a numerical value 4 is assigned as a number indicating the position of the light emitting diode 62 and the start of light emission of the light emitting diode 62b is assigned a numerical value 5 is assigned is assigned as a number indicating the position) are controlled by the light emission control portion 413 (in the step #44).

An instruction to move the group of variator lenses 52 backward is given to the motor control portion 411. The motor control portion 411 rotates the zoom motor 55 in accordance with this instruction, moves the groups of variator lenses 52 backward and waits until a detection signal is sent out from the light reception detecting portion 412 (in the steps #46 and #48).

When the group of variator lenses 52 is moved backward and the photo sensor 57 reaches the position corresponding to the light emitting diode 62b to which the numerical value 5 is assigned, light from the light emitting diode 62b is received by the photo sensor 57. Light reception is detected by the light reception detecting portion 412 through the input circuit 22, the result of the detection being sent out to the motor control portion 411. The motor control portion 411 informed of this detection of light reception stops driving the zoom motor 55 (in the step #50).

The foregoing operation is performed to move both the groups of variator lenses 52a and 52b (although in the flow chart of FIG. 23, description is made on movement of one group of variator lenses 52, the groups of variator lenses 52a and 52b are actually simultaneously moved by time sharing). Therefore, when driving by the zoom motor 55 is stopped, the zoom ratios of the two zoom lenses (first and second lenses) becomes the same.

The control portion 414 examines whether the zoom switch 27 continues to be depressed (in the step #40). When the zoom switch 27 continues to be depressed, the same instruction as described above is given to the light emission control portion 413 and the motor control portion 411, to further increase the zoom ratio (in the steps #42 to #50). In the above described manner, the zoom ratio continues to be increased while the zoom switch 27 is being depressed. When the zoom switch 27 is not depressed, the program is returned to the step #40.

When the switch b in the zoom switch 27 is depressed, almost the same operation as described above is performed. In the step #52 subsequently to the step #42, the light emission control portion 413 gives an instruction to move the position of the light emitting diode 62 to be lit by one in the direction of the group of front lenses 51 as well as gives the motor control portion 411 an instruction to move the group of variator lenses 52 to the side of the group of front lenses 51 (in the step #54).

The motor control portion 411 rotates the zoom motor 55 until it is informed of detection of light reception by the light reception detecting portion 412. When the motor control portion 411 moves the group of variator lenses 52 to the side of the group of front lenses 51 and it is informed of detection of light reception, rotation of the zoom motor 55 is stopped (in the steps #56 and #58).

The foregoing operation is repeated. When the switch b is not depressed, the program is returned to the step #40.

The group of variator lenses 52 is moved in accordance with the foregoing description. When the zoom switch 27 is turned on and then, turned off, the zoom ratios of one zoom lens including the groove 52a of variator lenses and the other zoom lens including the groove 52b of variator lenses are equal.

It should be noted that the present invention is not limited to the above described embodiments. In the above described embodiments, the zoom ratio is detected based on the position of the group of variator lenses 52 in the direction of the optical axis. However, the zoom ratio may be detected by detecting the position of the zoom ring 3 in the direction of rotation.

In the above described embodiments, the diode array 58 is used to detect the position of the group of variator lenses 52 in the direction of the optical axis. Description was made on a feed back type control system in which it is determined that the group of variator lenses 52 is in a predetermined position when the position of the light emitting diode 62 to be lighted in the diode array 58 is changed and light from this light emitting diode 62, the position of which is changed, is received by the photo sensor 57. However, the present invention is not limited to the same. For example, a position detecting plate having a very small slit along the direction of the optical axis may be provided and a photo sensor, a light emitting diode and the like for detecting this slit may be provided on the side of the lens barrel 60. When a slit adjacent to the slit detected before movement of the lens barrel 60 is detected by the photo sensor, it may be determined that the group of variator lenses 52 is moved to a predetermined position.

As described in the foregoing, according to the present invention, since the interlocked zooming apparatus used in the two-barrel type stereo scopic camera comprises an end image adjusting apparatus and an automatic image magnification adjusting apparatus, adjustment is made such that the sizes of images formed by both cameras in each of the wide-angle end and the telephoto end are the same. Thus, the sizes of the right and left images formed when the zoom ratio is varied is easily made.

In accordance with a preferred embodiment, the zoom lenses are moved by the pulse motors, so that adjustment is more easily made.

In accordance with another preferred embodiment, an amount of movement of each of the zoom lenses is calculated in advance, and feed back control is performed such that the zoom lens is moved by the amount of movement. As a result, the zoom ratio is surely adjusted by DC motors other than the pulse motors.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An interlocked zooming apparatus for operating a pair of video cameras, provided spaced apart from each other, in a synchronized manner for sensing an image of an object, a first video camera of the pair of video cameras comprising first zoom means and a second video camera of the pair of video cameras comprising second zoom means, each of the first and second zoom means moved between a first position corresponding to a first focal length and a second position corresponding to a second focal length, the interlocked zooming apparatus comprising:

first focal length changing means for changing the focal length of said first zoom means;

second focal length changing means for changing the focal length of the second zoom means;

zoom driving means for driving said first focal length changing means and said second focal length changing means in a synchronized manner by electric power; and magnification adjusting means, for adjusting to a first size a size of the image in the first position of each of the first zoom means and the second zoom means and for adjusting to a second size a size of the image in the second position of each of the first zoom means and the second zoom means, consisting of first position adjusting means for adjusting the first position of the first zoom means, and second position adjusting means for adjusting the second position of the first zoom means.

2. The interlocked zooming apparatus according to claim 1, said magnification adjusting means further comprising:

third position adjusting means for adjusting the first position of the second zoom means; and fourth position adjusting means for adjusting the second position of the second zoom means.

3. The interlocked zooming apparatus according to claim 1, the object arranged on an optical axis of each of the pair of video cameras extending therefrom to the object, and said magnification adjusting means comprising video camera moving means for independently moving at least one of the pair of video cameras to the direction of the object along a corresponding optical axis.

4. The interlocked zooming apparatus according to claim 3, the pair of video cameras held in single holding means, a groove along the corresponding optical axis of at least one of the pair of video cameras provided in said single holding means, and said at least one of the pair of video cameras comprising a projection extending into said groove, said video camera moving means moves said at least one of the pair of video cameras along said groove.

5. The interlocked zooming apparatus according to claim 1, said first focal length changing means and said second focal length changing means respectively comprising first driving means for moving the first zoom means between the first position and the second position and second driving means for moving the second zoom means between the first position and the second position, by electric power.

6. The interlocked zooming apparatus according to claim 5, the first zoom means capable of being moved a first distance from the first position to the second position, the second zoom means capable of being moved a second distance from the first position to the second position, a constant relation between a zoom ratio represented by a ratio of said second size to said first size and said first distance or said second distance, the interlocked zooming apparatus further comprising:

driving speed control means for controlling said first driving means and said second driving means such that the first and second zoom means are respectively moved by said first distance and said second distance in a same first time period.

7. The interlocked zooming apparatus according to claim 6, further comprising:

calculating means, operatively coupled to said driving speed control means and sensors for sensing corresponding positions of the first and second zoom means, for calculating a first rate from said first distance and said first time period and calculating a second rate from said second distance and said first time period.

8. The interlocked zooming apparatus according to claim 7, said first driving means and said second driving means respectively comprising pulse motors, and said driving speed control means sends pulses to said first driving means at said first rate while sending pulses to said second driving means at said second rate.

9. The interlocked zooming apparatus according to claim 7, further comprising:

first positioning means and second positioning means for respectively positioning the first zoom means and the second zoom means at said first rate and said second rate, respectively.

10. The interlocked zooming apparatus according to claim 9, said first positioning means and said second positioning means respectively comprising:
first position indicating means and second position indicating means respectively extending from the first position to the second position along the first and second zoom means; and
first indicated position detecting means and second indicated position detecting means for respectively detecting positions indicated by said first and second position indicating means.

11. The interlocked zooming apparatus according to claim 10,
said first position indicating means and said second position indicating means respectively comprising a first plurality of light emitting means and a second plurality of light emitting means respectively arranged from said first position to said second position,
said first indicated position detecting means and said second indicated position detecting means respectively comprising photo sensors.

12. The interlocked zooming apparatus according to claim 11,
said first and second plurality of light emitting means sequentially emit light, respectively, in extending directions, the rate in which said first and second plurality of light emitting means are respectively sequentially activated corresponding to said first and second rates.

13. An interlocked zooming apparatus for operating a pair of video cameras, provided spaced apart from each other, in a synchronized manner for sensing an image of an object, a first video camera of the pair of video cameras comprising first zoom means and a second video camera of the pair of video cameras comprising second zoom means, each of the first and second zoom means moved between a first position corresponding to a first focal length and a second position corresponding to a second focal length, the interlocked zooming apparatus comprising:
first focal length changing means for changing a focal length of the first zoom means;
second focal length changing means for changing a focal length of the second zoom means;
zoom driving means for driving said first focal length changing means and said second focal length changing means in a synchronized manner by electric power; and
magnification adjusting means, for adjusting to a first size a size of the image in the first position of each of the first zoom means and the second zoom means and for adjusting to a second size a size of the image in the second position of each of the first zoom means and the second zoom means, the object on an optical axis of each of the pair of video cameras extending therefrom to the object, said magnification adjusting means consisting essentially of
video camera moving means for independently moving at least one of the pair of video cameras toward or away from the object along a corresponding axis.

14. The interlocked zooming apparatus according to claim 13,
the pair of video cameras held in single holding means, a groove along said optical axis of at least one of the pair of video cameras provided in said single holding means, and
said at least one of the pair of video cameras comprising a projection extending into said groove,
said video camera moving means moves said at least one of the pair of video cameras along said groove.

* * * * *